US012763498B2

(12) United States Patent
Nakano et al.

(10) Patent No.: US 12,763,498 B2
(45) Date of Patent: Oct. 13, 2026

(54) WIRING SYSTEM

(71) Applicant: Sumitomo Wiring Systems, Ltd., Mie (JP)

(72) Inventors: Haruka Nakano, Mie (JP); Masaki Mizushita, Mie (JP); Yuya Fukami, Mie (JP); Jun Yamasaki, Mie (JP); Hitomi Nagasawa, Mie (JP); Motohiro Yokoi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 360 days.

(21) Appl. No.: 18/705,782

(22) PCT Filed: Oct. 27, 2022

(86) PCT No.: PCT/JP2022/040085
§ 371 (c)(1),
(2) Date: Apr. 29, 2024

(87) PCT Pub. No.: WO2023/090108
PCT Pub. Date: May 25, 2023

(65) Prior Publication Data

US 2025/0112382 A1 Apr. 3, 2025

(30) Foreign Application Priority Data

Nov. 17, 2021 (JP) ................................ 2021-187004

(51) Int. Cl.
*H01R 4/62* (2006.01)

(52) U.S. Cl.
CPC ..................................... *H01R 4/62* (2013.01)

(58) Field of Classification Search
CPC .............................. H01R 4/62; B60R 16/0207
See application file for complete search history.

(56) References Cited

U.S. PATENT DOCUMENTS 10,367,306 B2 * 7/2019 Matroja ............ H01R 13/6473
10,374,367 B2 * 8/2019 Maesoba ........... H01R 13/6589
(Continued)

FOREIGN PATENT DOCUMENTS

CN 102957001 A 3/2013
CN 214477944 U 10/2021
(Continued)

OTHER PUBLICATIONS

International Search Report issued in International Application No. PCT/JP2022/040085, dated Jan. 17, 2023, along with an English translation thereof.

(Continued)

*Primary Examiner* — Marcus E Harcum
(74) *Attorney, Agent, or Firm* — Greenblum & Bernstein, P.L.C.

(57) ABSTRACT

A wiring system includes: a main wire-side wiring member including at least one main wire-side circuit and a main wire-side connector to which the main wire-side circuit is connected; and an apparatus-side wiring member including an apparatus-side connector connected to the main wire-side connector and at least one apparatus-side circuit having one end connected to the apparatus-side connector and another end electrically connected to an electrical apparatus. At least one of the main wire-side circuits is an aluminum wire. At least one of the apparatus-side circuits is a copper wire connected to the aluminum wire via the apparatus-side connector and the main wire-side connector.

6 Claims, 7 Drawing Sheets

(56) References Cited

U.S. PATENT DOCUMENTS

| | | | | |
|---|---|---|---|---|
| 10,431,906 | B1 * | 10/2019 | Reed | H01B 7/0045 |
| 10,486,622 | B2 * | 11/2019 | Kato | B60K 37/10 |
| 10,597,476 | B2 * | 3/2020 | Tanaka | H01R 43/0214 |
| 2010/0096185 | A1 | 4/2010 | Otsuka et al. | |
| 2013/0045610 | A1 | 2/2013 | Drew et al. | |
| 2014/0235116 | A1 * | 8/2014 | Otsuka | H01R 13/03 439/877 |
| 2015/0311623 | A1 * | 10/2015 | Naganishi | H01R 43/0484 439/589 |
| 2015/0349471 | A1 * | 12/2015 | Maki | B60R 16/0215 307/10.1 |
| 2016/0028177 | A1 * | 1/2016 | Nomura | H01R 43/16 428/626 |
| 2016/0079684 | A1 * | 3/2016 | Naganishi | H01R 11/12 439/877 |
| 2017/0133122 | A1 | 5/2017 | Uchida | |
| 2018/0001848 | A1 | 1/2018 | Shiratori et al. | |
| 2018/0118135 | A1 * | 5/2018 | Tsukamoto | B60R 16/03 |
| 2018/0301242 | A1 * | 10/2018 | Sugino | H05K 9/0098 |
| 2020/0254945 | A1 * | 8/2020 | Murata | B60R 16/0215 |
| 2020/0258654 | A1 * | 8/2020 | Nakai | H01R 4/183 |
| 2020/0282613 | A1 * | 9/2020 | Minami | B29C 45/80 |

FOREIGN PATENT DOCUMENTS

| | | | | |
|---|---|---|---|---|
| DE | 102018110225 | A1 * | 10/2019 | H01R 13/5221 |
| JP | S53-073379 | A | 6/1978 | |
| JP | S64-67443 | A | 3/1989 | |
| JP | 2009-070769 | A | 4/2009 | |
| JP | 2009-170178 | A | 7/2009 | |
| JP | 2013-041813 | A | 2/2013 | |
| JP | 2014-087182 | A | 5/2014 | |
| JP | 2014-107072 | A | 6/2014 | |
| JP | 2016-035815 | A | 3/2016 | |
| JP | 2016-152089 | A | 8/2016 | |
| JP | 2017-027696 | A | 2/2017 | |
| JP | 2018-001861 | A | 1/2018 | |
| JP | 2019-137394 | A | 8/2019 | |
| JP | 2021034167 | A * | 3/2021 | |

OTHER PUBLICATIONS

Japanese Office Action in counterpart Japanese Application No. 2021-187004, dated Aug. 27, 2024 (along with English Translation thereof).

Office Action in Japanese Patent Application No. 2025-017507, dated Dec. 23, 2025, along with translation thereof.

* cited by examiner

WIRING SYSTEM

TECHNICAL FIELD

The present disclosure relates to a wiring system.

BACKGROUND ART

Patent Document 1 discloses an electrical wire with a terminal in which a corrosion covering is applied to a connection part between an aluminum wire and a copper terminal.

PRIOR ART DOCUMENTS

Patent Document(s)

Patent Document 1: Japanese Patent Application Laid-Open No. 2014-107072

SUMMARY

Problem to be Solved by the Invention

The corrosion covering described in Patent Document 1 causes increase in cost in incorporating the aluminum wire into a wiring system. It is desired that the aluminum wire is easily incorporated into the wiring system.

Accordingly, an object of the present disclosure is to provide a technique capable of easily incorporating an aluminum wire into a wiring system.

Means to Solve the Problem

A wiring system according to the present disclosure includes: a main wire-side wiring member including at least one main wire-side circuit and a main wire-side connector to which the main wire-side circuit is connected; and an apparatus-side wiring member including an apparatus-side connector connected to the main wire-side connector and at least one apparatus-side circuit having one end connected to the apparatus-side connector and another end electrically connected to an electrical apparatus, wherein at least one of the main wire-side circuits is an aluminum wire, and at least one of the apparatus-side circuits is a copper wire connected to the aluminum wire via the apparatus-side connector and the main wire-side connector.

Effects of the Invention

According to the present disclosure, the aluminum wire is easily incorporated into the wiring system.

DESCRIPTION OF EMBODIMENT(S)

Description of Embodiment of Present Disclosure

Figure 1:
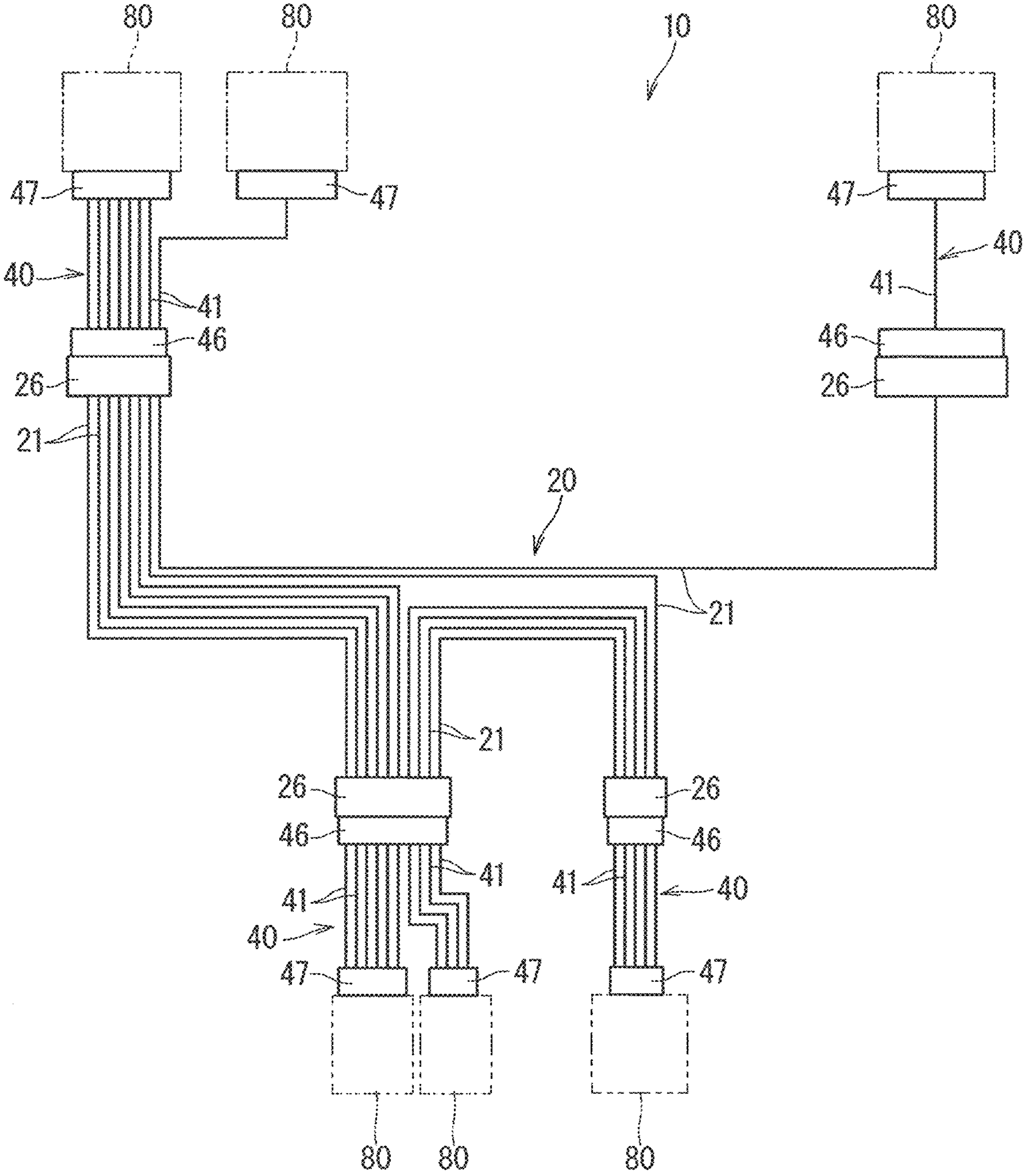
FIG. 1 is an explanation view illustrating a wiring system according to an embodiment 1.

Embodiments of the present disclosure are listed and described firstly.

A wiring system according to the present disclosure is as follows.

(1) A wiring system includes: a main wire-side wiring member including at least one main wire-side circuit and a main wire-side connector to which the main wire-side circuit is connected; and an apparatus-side wiring member including an apparatus-side connector connected to the main wire-side connector and at least one apparatus-side circuit having one end connected to the apparatus-side connector and another end electrically connected to an electrical apparatus, wherein at least one of the main wire-side circuits is an aluminum wire, and at least one of the apparatus-side circuits is a copper wire connected to the aluminum wire via the apparatus-side connector and the main wire-side connector. The main wire-side wiring member is electrically connected to the electrical apparatus via the apparatus-side wiring member, thus an arrangement position of the main wire-side connector can be located in a position away from an arrangement position of the electrical apparatus by a length of the apparatus-side wiring member. Accordingly, even in a case where the electrical apparatus is disposed in an area easily subject to splash of water, for example, the main wire-side connector can be disposed in an area subject to splash of water more hardly than the area where the electrical apparatus is disposed. Thus, a configuration of corrosion proofing on the aluminum wire of the main wire-side wiring member is unnecessary or simplified, and the aluminum wire is easily incorporated into the wiring system. The aluminum wire is incorporated into the wiring system, thus a weight of the wiring system can be reduced.

(2) It is applicable that the wiring system according to (1) exclusively includes a first specification wiring member and a second specification wiring member to which different types of the electrical apparatus are connected, respectively, as the apparatus-side wiring member, wherein the first specification wiring member includes a first specification connector as the apparatus-side connector and at least one first specification circuit as the apparatus-side circuit, the second specification wiring member includes a second specification connector as the apparatus-side connector and at least one second specification circuit as the apparatus-side circuit, the first specification circuit includes a first purpose circuit connected to the electrical apparatus having a first purpose, the second specification circuit includes a second purpose circuit connected to the electrical apparatus having a second purpose different from the first purpose, the main wire-side circuit includes at least one multipurpose circuit, when the first specification connector is connected to the main wire-side connector, the multipurpose circuit is connected to the first purpose circuit, and when the second specification connector is connected to the main wire-side connector, the multipurpose circuit is connected to the second purpose circuit. Accordingly, plural types of wiring member having specifications different from each other can be used in accordance with a type of the electrical apparatus as the apparatus-side wiring member while the main wire-side wiring member is used in common in the wiring system, and it is possible to easily deal with a difference of specification of a vehicle. The main wire-side wiring member used in common includes the aluminum wire, thus the aluminum wire can be incorporated into the wiring system regardless of the specification of the apparatus-side wiring member.

(3) In the wiring system according to (2), it is applicable that at least one of the multipurpose circuits is the aluminum wire, and each of at least one of the first specification circuits and at least one of the second specification circuits is the copper wire. Normally, as a current value of current flowing in a circuit gets larger, a conductor cross-sectional area of the circuit needs to be increased, thus a weight of the circuit increases by the increase of the conduction cross-sectional area thereof. There is a case where a large conductor cross-sectional area corresponding a purpose having the largest current value in a plurality of purposes different from each other is defined as a conductor cross-sectional area of the multipurpose circuit. Even in this case, at least one of the multipurpose circuits is the aluminum wire, thus increase of the weight of the multipurpose circuit can be suppressed.

(4) In the wiring system according to any one of (1) to (3), it is applicable that the electrical apparatus includes a first electrical apparatus and a second electrical apparatus disposed in an area having a lower possibility of splash of water than an area where the first electrical apparatus is disposed, the apparatus-side wiring member includes a first electrical apparatus connector connector-connected to the first electrical apparatus and a second electrical apparatus connector connector-connected to the second electrical apparatus, the apparatus-side circuit includes at least one first electrical apparatus circuit connecting the first electrical apparatus connector and the apparatus-side connector and at least one second electrical apparatus circuit connecting the second electrical apparatus connector and the apparatus-side connector, each of at least one circuit connected to the first electrical apparatus circuit and at least one circuit connected to the second electrical apparatus circuit in the main wire-side circuits is the aluminum wire, at least one of the first electrical apparatus circuits is the copper wire, and at least one of the second electrical apparatus circuits is an aluminum wire connected to the aluminum wire via the apparatus-side connector and the main wire-side connector. Accordingly, the aluminum wire can also be easily incorporated into the apparatus-side wiring member.

(5) In the wiring system according to any one of (1) to (4), it is applicable that the main wire-side wiring member includes a plurality of electrical wires each constituting the main wire-side circuit, when the plurality of electrical wires are divided into a thin electrical wire group made up of only electrical wires having a cross-sectional area of 0.13 sq or less and a thick electrical wire group made up of only electrical wires having a cross-sectional area larger than 0.13 sq based on a conductor cross-sectional area, the thick electrical wire group includes the aluminum wire, and a ratio of the aluminum wire is equal to or higher than a ratio of a copper wire in the thick electrical wire group. Accordingly, many electrical wires in the thick electrical wire group having the large conductor cross-sectional area can be the aluminum wires in the main wire-side circuits, and increased is an effect of reducing the weight of the main wire-side wiring member.

(6) In the wiring system according to any one of (1) to (5), it is applicable that a ratio of the aluminum wire in a circuit connected to the apparatus-side circuit in the main wire-side circuit may be equal to or higher than a ratio of an aluminum wire in a circuit connected to the main wire-side circuit in the apparatus-side circuit. Increased accordingly is an effect of reducing the weight of the main wire-side wiring member.

(7) In the wiring system according to any one of (1) to (6), it is applicable that the main wire-side connector includes a connector terminal connected to the aluminum wire, and a connection part between the connector terminal and the aluminum wire is not corrosion proofed. Accordingly, increase of cost of the wiring system is suppressed.

Detailed Description of Embodiment of Present Disclosure

Specific examples of a wiring system of the present disclosure are described hereinafter with reference to the drawings. The present disclosure is not limited to these examples, but is indicated by claims, and it is intended that meanings equivalent to claims and all modifications within a scope of claims are included.

Embodiment 1

A wiring member according to an embodiment 1 is described hereinafter.

<Whole Configuration of Wiring System>

A whole configuration of a wiring system is described with reference to FIG. 1. FIG. 1 is an explanation view illustrating a wiring system 10 according to the embodiment 1. The circuit and the connector, for example, are distinguished and described in FIG. 1, however, the number of the circuits, the route of the circuit, and the number of the connectors are examples, thus can be changed in accordance with a system and specification to be applied.

The wiring system 10 is a system for electrically connecting electrical apparatuses 80 in a vehicle, for example. The wiring system 10 includes a main wire-side wiring member 20 and an apparatus-side wiring member 40. The main wire-side wiring member 20 includes a main wire-side circuit 21 and a main wire-side connector 26 to which the main wire-side circuit 21 is connected. The apparatus-side wiring member 40 includes an apparatus-side connector 46 connected to the main wire-side connector 26 and an apparatus-side circuit 41 having one end connected to the apparatus-side connector 46. The other end of the apparatus-side circuit 41 is electrically connected to the electrical apparatus 80 in the apparatus-side wiring member 40. The description of the present embodiment is based on an assumption that all of the main wire-side circuits 21 are electrically connected to the electrical apparatus 80 via the apparatus-side circuit 41. Needless to say, some main wire-side circuits 21 may be electrically connected to the electrical apparatus 80 directly without intervention of the apparatus-side circuit 41.

In the example illustrated in FIG. 1, four apparatus-side wiring members 40 are connected to one main wire-side wiring member 20. The main wire-side wiring member 20 includes four main wire-side connectors 26. Each of four apparatus-side wiring members 40 is connected to a corresponding one main wire-side connector 26 in four main wire-side connectors 26. The number of the main wire-side connectors 26 and the number of the apparatus-side wiring members 40 need to coincide with each other. For example, one apparatus-side wiring member 40 may be connected to the plurality of main wire-side connectors 26.

Each main wire-side circuit 21 has both end portions connected to the main wire-side connectors 26 different from each other, respectively. One main wire-side connector 26 is connected to at least the other one main wire-side connector 26 via the main wire-side circuit 21. The number of the main wire-side circuits 21 and connection destinations thereof can be appropriately set in accordance with the electrical apparatus 80, for example.

Each apparatus-side wiring member 40 connects the electrical apparatus 80 and the main wire-side connector 26. It is sufficient that the apparatus-side wiring member 40 is connected to at least one electrical apparatus 80. The apparatus-side wiring member 40 may be connected to the plurality of electrical apparatuses 80. The other end of the apparatus-side circuit 41 may be connected to an apparatus connector 47, and may be connected to the electrical apparatus 80 via the apparatus connector 47. The other end of the apparatus-side circuit 41 may be directly led to the electrical apparatus 80, and may be connected to an electrical element of the electrical apparatus 80 without intervention of the connector.

The circuit such as the main wire-side circuit 21 and the apparatus-side circuit 41 in the wiring system 10 is a part made up of a wire-like conductive member to transmit electricity. The circuit may be used for transmitting an electrical signal or electrical power. The circuit may be a core wire in an electrical wire including the core wire and a covering around the core wire. The electrical wire may be a non-stranded electrical wire or a stranded electrical wire, or may also have a form of a cable around which a shield layer is formed. The circuit may not be a core wire in an electrical wire. For example, the circuit may be a conductor formed along a predetermined route on a flat insulating base material. For example, the circuit may be a circuit pattern in a flexible printed circuit (FPC) in which a circuit pattern of metal foil is formed between a pair of resin films. Description in the present embodiment is based on an assumption that the circuit is a core wire in an electrical wire.

<Connection Part in Wiring System 10>

Figure 2:
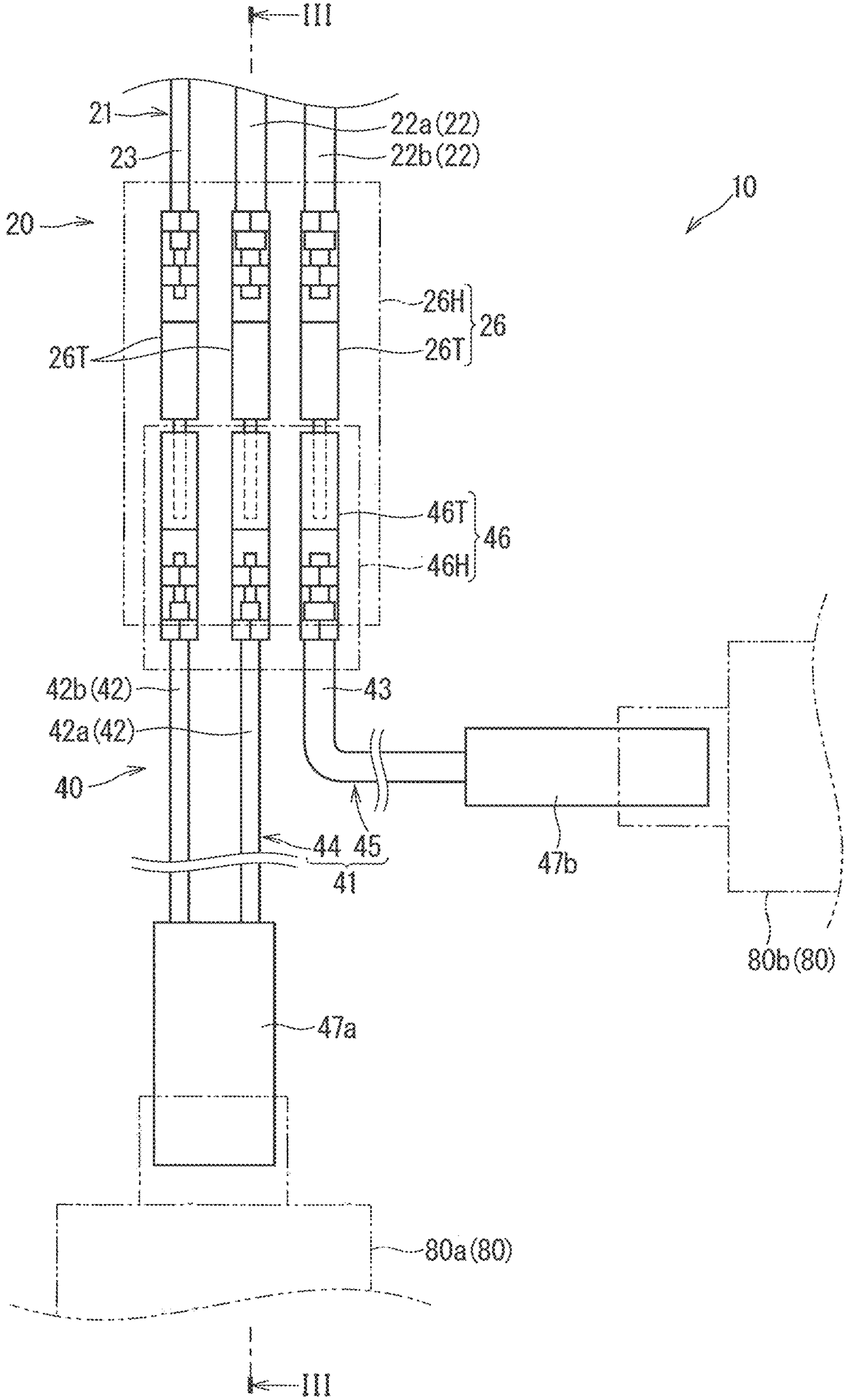
FIG. 2 is an explanation view illustrating each connection part in one apparatus-side wiring member.
Figure 3:
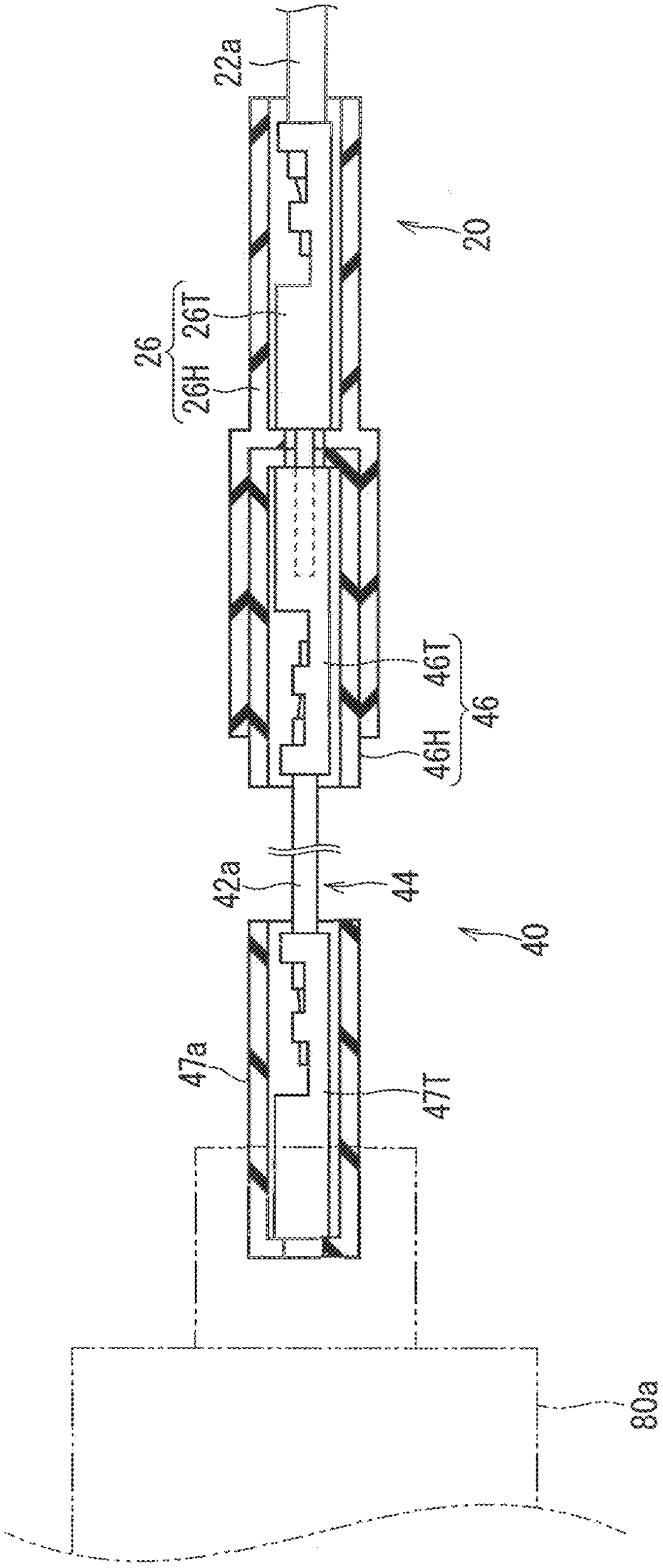
FIG. 3 is a cross-sectional view along a III-III line in FIG. 2.

FIG. 2 is an explanation view illustrating each connection part in one apparatus-side wiring member 40. FIG. 3 is a cross-sectional view along a III-III line in FIG. 2.

The main wire-side circuit 21 and the apparatus-side circuit 41 are connected to each other via the main wire-side connector 26 and the apparatus-side connector 46. The main wire-side connector 26 includes a main wire-side connector terminal 26T and a main wire-side connector housing 26H holding the main wire-side connector terminal 26T. An end portion of the main wire-side circuit 21 is connected to the main wire-side connector terminal 26T. The apparatus-side connector 46 includes an apparatus-side connector terminal 46T and an apparatus-side connector housing 46H holding the apparatus-side connector terminal 46T. An end portion of the apparatus-side circuit 41 is connected to the apparatus-side connector terminal 46T. When each circuit is an electrical wire, the connector terminal and the electrical wire are electrically connected and fixed to each other by crimping, pressure bonding, or melting joint, for example. In the example illustrated in FIG. 2, the main wire-side connector terminal 26T is a male terminal, and the apparatus-side connector terminal 46T is a female terminal, however, it is also applicable that the main wire-side connector terminal 26T is a female terminal, and the apparatus-side connector terminal 46T is a male terminal.

At least one of the main wire-side circuits 21 is an aluminum wire 22. At least one of the apparatus-side circuits 41 is a copper wire 42 connected to the aluminum wire 22 via the apparatus-side connector 46 and the main wire-side connector 26. In the present specification, the aluminum wire indicates an electrical wire in which a core wire is formed of a metal material having aluminum as a main component. The metal material having aluminum as the main component may be single aluminum or aluminum alloy. In the present specification, the copper wire indicates an electrical wire in which a core wire is formed of a metal material having copper as a main component. The metal material having copper as the main component may be single copper or copper alloy.

In the present embodiment, the electrical apparatus 80 to which the apparatus-side wiring member 40 is connected includes a first electrical apparatus 80*a* and a second electrical apparatus 80*b*. The second electrical apparatus 80*b* is disposed in an area having a lower possibility of splash of water than an area where the first electrical apparatus 80*a* is disposed. An area where a connection body of the main wire-side connector 26 and the apparatus-side connector 46 is disposed may also be an area having a lower possibility of splash of water than the area where the first electrical apparatus 80*a* is disposed. An area having a high possibility of splash of water is referred to as a first area, and an area having a low possibility of splash of water is referred to as a second area in some cases hereinafter.

Considered as water which may splash (in addition to water, also including liquid other than water) is water caused by a passenger (water which a passenger spills or rainwater on a passenger, for example), water caused by submergence of a lower part of a vehicle, or water caused by dew condensation in an air-conditioner, for example.

When the water which may splash is the water caused by the passenger, it is considered as a combination of the first area and the second area is that the first area is an area exposed to an interior of the vehicle and the second area is an area which is not exposed to the interior of the vehicle, for example. For example, it is considered that the first area is an area which is not exposed to the interior of the vehicle but is located close to an opening part exposed to the interior of the vehicle, and the second area is an area which is not exposed to the interior of the vehicle and is located away from the opening part exposed to the interior of the vehicle.

When the water which may splash is the water caused by submergence of the lower part of the vehicle, it is considered as a combination of the first area and the second area is that the first area is an area located close to a lower side of the vehicle, and the second area is an area closer to an upper side of the vehicle than the first area, for example.

When the water which may splash is the water caused by dew condensation in the air-conditioner, it is considered as a combination of the first area and the second area is that the first area is an area located close to a supply opening of the air-conditioner or a duct, and the second area is an area farther away from the supply opening of the air-conditioner or the duct than the first area, for example.

The apparatus-side wiring member 40 includes a first electrical apparatus connector 47*a* and a second electrical apparatus connector 47*b*. The first electrical apparatus connector 47*a* is connector-connected to the first electrical apparatus 80*a*. The second electrical apparatus connector 47*b* is connector-connected to the second electrical apparatus 80*b*. The apparatus-side circuit 41 includes a first electrical apparatus circuit 44 and a second electrical apparatus circuit 45. The first electrical apparatus circuit 44 connects the first electrical apparatus connector 47*a* and the apparatus-side connector 46. The second electrical apparatus circuit 45 connects the second electrical apparatus connector 47*b* and the apparatus-side connector 46. The main wire-side circuit 21 includes a circuit connected to the first electrical apparatus circuit 44 and a circuit connected to the second electrical apparatus circuit 45.

At least one circuit connected to the first electrical apparatus circuit 44 and at least one circuit connected to the second electrical apparatus circuit 45 in the main wire-side circuits 21 are aluminum wires 22*a* and 22*b*. At least one of the first electrical apparatus circuits 44 is a copper wire 42*a* connected to the aluminum wire 22*a* of the main wire-side circuit 21 via the apparatus-side connector 46 and the main wire-side connector 26. At least one of the second electrical apparatus circuits 45 is an aluminum wire 43 connected to the aluminum wire 22*b* of the main wire-side circuit 21 via the apparatus-side connector 46 and the main wire-side connector 26.

In the present embodiment, the main wire-side circuit 21 also includes a circuit made up of a copper wire 23. A circuit in the apparatus-side circuits 41 connected to the circuit made up of the copper wire 23 of the main wire-side circuit 21 is a copper wire 42*b*. In the example illustrated in FIG. 2, only the first electrical apparatus circuit 44 includes the copper wire 42*b*, however, the second electrical apparatus circuit 45 may also include a copper wire. The main wire-side circuit 21 may be a circuit connected to the copper wire of the second electrical apparatus circuit 45 and include a circuit made up of a copper wire.

At least one of the main wire-side connector terminals 26T is connected to the aluminum wire 22. In the example illustrated in FIG. 2, a connection part between the aluminum wire 22 and the main wire-side connector terminal 26T is corrosion proofed. Corrosion proofing indicates a state where there is no structure for suppressing water reaching a connection part between a connector terminal and an electrical wire in a case where the water enters a connector housing from an opening of a cavity in the connector housing, for example, thus the water can simply reach the connection part between the connector terminal and the electrical wire. Examples of the structure for suppressing the water reaching the connection part between the connector terminal and the electrical wire include a covering member provided to the connection part between the main wire-side connector terminal 26T and the aluminum wire 22, a rubber plug covering an electrical wire or a terminal in a cavity, or resin filling a cavity.

The connection part between the main wire-side connector terminal 26T and the main wire-side circuit 21 and the connection part between the apparatus-side connector terminal 46T and the apparatus-side circuit 41 may not be corrosion proofed regardless of whether or not the circuit is the copper wire or the aluminum wire. The connection part between the main wire-side connector terminal 26T and the main wire-side circuit 21 and the connection part between the apparatus-side connector terminal 46T and the apparatus-side circuit 41 may have a corrosion proofing structure when the circuit is the aluminum wire.

The connection part between the connector terminal 47T of the apparatus connector 47 and the apparatus-side circuit 41 may not be corrosion proofed when the apparatus-side circuit 41 is the copper wire 42. When the apparatus-side circuit 41 is the aluminum wire, the connection part may have a corrosion proofing structure. The connection part between the connector terminal of the apparatus connector 47 and the apparatus-side circuit 41 may have high corrosion proofing properties than the connection part between the apparatus-side connector terminal 46T and the apparatus-side circuit 41.

<Electrical Wire Configuration in Main Wire-Side Wiring Member 20>

Figure 4:
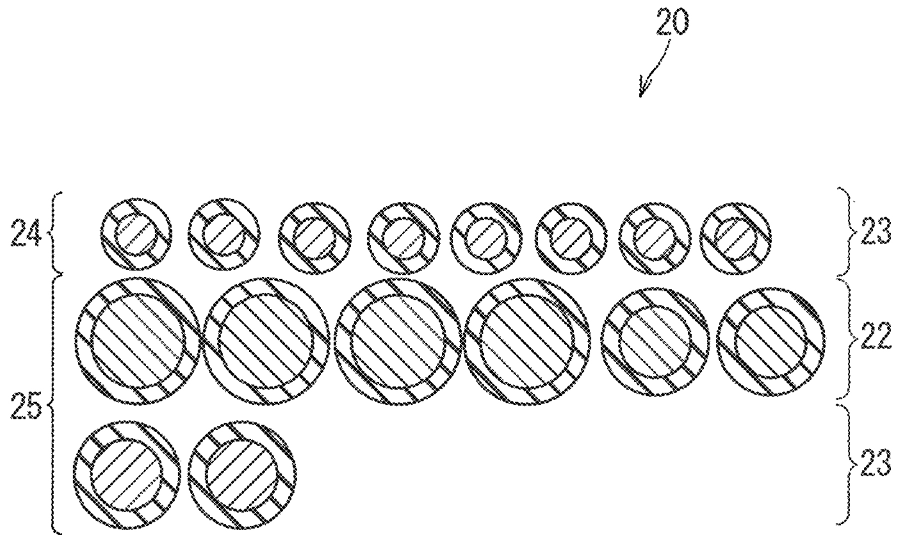
FIG. 4 is an explanation view illustrating an example of an electrical wire configuration in a main wire-side wiring member.

FIG. 4 is an explanation view illustrating an example of an electrical wire configuration in the main wire-side wiring member 20.

The main wire-side wiring member 20 includes a plurality of electrical wires 22 and 23. Each of the plurality of electrical wires 22 and 23 constitutes the main wire-side circuit 21. The plurality of electrical wires 22 and 23 are divided into a thin electrical wire group 24 made up of only electrical wires having a cross-sectional area of 0.13 sq or less and a thick electrical wire group 25 made up of only electrical wires having a cross-sectional area larger than 0.13 sq based on a conductor cross-sectional area. A unit sq is a standard regarding a cross-sectional area of a core wire regulated by JIS standard, and indicates square millimeter. The circuit can be used for transmitting each type of electricity within a range of current allowed in accordance with a cross-sectional area and material of the circuit, for example.

A ratio of the thin electrical wire group 24 and the thick electrical wire group 25 in the whole main wire-side circuit 21 are not particularly limited, but are appropriately set. For example, it is applicable that the ratio of the thin electrical wire group 24 is 40 to 60% and the ratio of the thick electrical wire group 25 is 60 to 40% in the whole main wire-side circuit 21. In the example illustrated in FIG. 4, the thin electrical wire group 24 includes only the copper wire 23. The thin electrical wire group 24 may include an electrical wire other than the copper wire 23.

As illustrated in FIG. 4, the thick electrical wire group 25 includes the aluminum wire 22. The ratio of the aluminum wire 22 is equal to or higher than that of the copper wire 23 in the thick electrical wire group 25. Specifically, in the example illustrated in FIG. 4, the thick electrical wire group 25 includes six aluminum wires 22 and two copper wires 23. In this case, the ratio of the aluminum wire 22 is 75%, and the ratio of the copper wire 23 is 25% in the thick electrical wire group 25. The ratio of the aluminum wire 22 may be equal to or higher than 60%, equal to or higher than 70%, equal to or higher than 80%, or equal to or higher than 90% in the thick electrical wire group 25. In the example illustrated in FIG. 4, the thick electrical wire group 25 includes the copper wire 23, however, the thick electrical wire group 25 may not include the copper wire 23. That is to say, the ratio of the aluminum wire 22 may be 100% in the thick electrical wire group 25.

In the present embodiment, the thin electrical wire group 24 includes eight copper wires 23. Thus, the ratio of the aluminum wire 22 is equal to or higher than 37.5% and the ratio of the copper wire 23 is 72.5% in the plurality of electrical wires 22 and 23 in the main wire-side wiring member 20. In the present embodiment, the ratio of the aluminum wire 22 is lower than that of the copper wire 23 in the plurality of electrical wires 22 and 23 in the main wire-side wiring member 20, however, the ratio of the aluminum wire 22 may be equal to or higher than that of the copper wire 23 in the plurality of electrical wires 22 and 23 in the main wire-side wiring member 20.

<Ratio of Aluminum Wire in Connector Connection Part of Wiring Members>

In the present embodiment, the ratio of the aluminum wire 22 in the circuit connected to the apparatus-side circuit 41 in the main wire-side circuit 21 is equal to or higher than that of the aluminum wire 43 in the circuit connected to the main wire-side circuit 21 in the apparatus-side circuit 41. It is sufficient that such a configuration is established in at least one connector connection part in a plurality of connector connection parts between the main wire-side wiring member 20 and the apparatus-side wiring member 40, thus such a configuration may be or may not be established in all of the plurality of connector connection parts.

In the present embodiment, the circuit connected to the main wire-side circuit 21 in the apparatus-side circuit 41 includes the aluminum wire 43. Accordingly, considered firstly is a case where the circuit connected to the main wire-side circuit 21 in the apparatus-side circuit 41 includes the aluminum wire 43.

A combination of the main wire-side circuit 21 and the apparatus-side circuit 41 connected to each other is expressed as (the main wire-side circuit 21, the apparatus-side circuit 41). For example, when an electrical wire used for (the main wire-side circuit 21, the apparatus-side circuit 41) is only the copper wire and the aluminum wire, a combination considered as (the main wire-side circuit 21, the apparatus-side circuit 41) is four combinations of (copper wire 23, copper wire 42), (the aluminum wire 22, aluminum wire 43), (the aluminum wire 22, the copper wire 42), and (copper wire 23, aluminum wire 43). The number of (the aluminum wire 22, the copper wire 42) may be equal to or larger than the number of (the copper wire 42, the aluminum wire 22) in this four combinations. Accordingly, the ratio of the aluminum wire 22 in the circuit connected to the apparatus-side circuit 41 in the main wire-side circuit 21 is equal to or higher than that of the aluminum wire 43 in the circuit connected to the main wire-side circuit 21 in the apparatus-side circuit 41. The number of (the copper wire 23, the aluminum wire 43) may be zero.

Specifically, in the connector connection part illustrated in FIG. 2, one (the copper wire 23, the copper wire 42), one (the aluminum wire 22, aluminum wire 43), and (the aluminum wire 22, the copper wire 42) are located as (the main wire-side circuit 21, the apparatus-side circuit 41), and the number of (the copper wire 23, the aluminum wire 43) is zero. In this case, the ratio of the aluminum wire 22 in the circuit connected to the apparatus-side circuit 41 in the main wire-side circuit 21 is 66.7%, and the ratio of the aluminum wire 43 in the circuit connected to the main wire-side circuit 21 in the apparatus-side circuit 41 is 33.3%.

Considered next is a case where the circuit connected to the main wire-side circuit 21 in the apparatus-side circuit 41 does not include the aluminum wire 43. In this case, the ratio of the aluminum wire 43 in the circuit connected to the main wire-side circuit 21 in the apparatus-side circuit 41 is zero. In contrast, the ratio of the aluminum wire 22 in the circuit connected to the apparatus-side circuit 41 in the main wire-side circuit 21 is not zero but is larger than zero. Accordingly, the ratio of the aluminum wire 22 in the circuit connected to the apparatus-side circuit 41 in the main wire-side circuit 21 is equal to or higher than that of the aluminum wire 43 in the circuit connected to the main wire-side circuit 21 in the apparatus-side circuit 41 also in the case where the circuit connected to the main wire-side circuit 21 in the apparatus-side circuit 41 does not include the aluminum wire 43.

Effect Etc.

According to the wiring system 10 having the above configuration, the main wire-side wiring member 20 is electrically connected to the electrical apparatus 80 via the apparatus-side wiring member 40, thus the arrangement position of the main wire-side connector 26 can be located in a position away from the arrangement position of the electrical apparatus 80 by the length of the apparatus-side wiring member 40. Accordingly, even in the case where the electrical apparatus 80 is disposed in the area easily subject to splash of water, for example, the main wire-side connector 26 can be disposed in the area subject to splash of water more hardly than the area where the electrical apparatus 80 is disposed. Thus, the configuration of corrosion proofing on the aluminum wire 22 of the main wire-side wiring member 20 is unnecessary or simplified, and the aluminum wire 22 is easily incorporated into the wiring system 10. The aluminum wire 22 is incorporated into the wiring system 10, thus the weight of the wiring system 10 can be reduced.

At least one of the second electrical apparatus circuits 45 connected to the second electrical apparatus **80*b* disposed in the area subject to splash of water more hardly than the area where the first electrical apparatus 80*a* is disposed is the aluminum wire 43 connected to the aluminum wire 22*b* of the main wire-side circuit 21 via the apparatus-side connector 46 and the main wire-side connector 26. Accordingly, the aluminum wire 43 can also be easily incorporated into the apparatus-side wiring member 40**.

The thick electrical wire group 25 includes the aluminum wire 22, and the ratio of the aluminum wire 22 is equal to or higher than that of the copper wire 23 in the thick electrical wire group 25. Accordingly, many electrical wires in the thick electrical wire group 25 having the large conductor cross-sectional area can be the aluminum wires 22 in the main wire-side circuits 21, and increased is the effect of reducing the weight of the main wire-side wiring member 20.

The ratio of the aluminum wire 22 in the circuit connected to the apparatus-side circuit 41 in the main wire-side circuit 21 is equal to or higher than that of the aluminum wire 43 in the circuit connected to the main wire-side circuit 21 in the apparatus-side circuit 41. Increased accordingly is the effect of reducing the weight of the main wire-side wiring member 20.

The main wire-side connector 26 includes the main wire-side connector terminal 26T connected to the aluminum wire 22, and the connection part between the main wire-side connector terminal 26T and the aluminum wire 22 is corrosion proofed. Accordingly, increase of cost of the wiring system 10 is suppressed.

Figure 5:
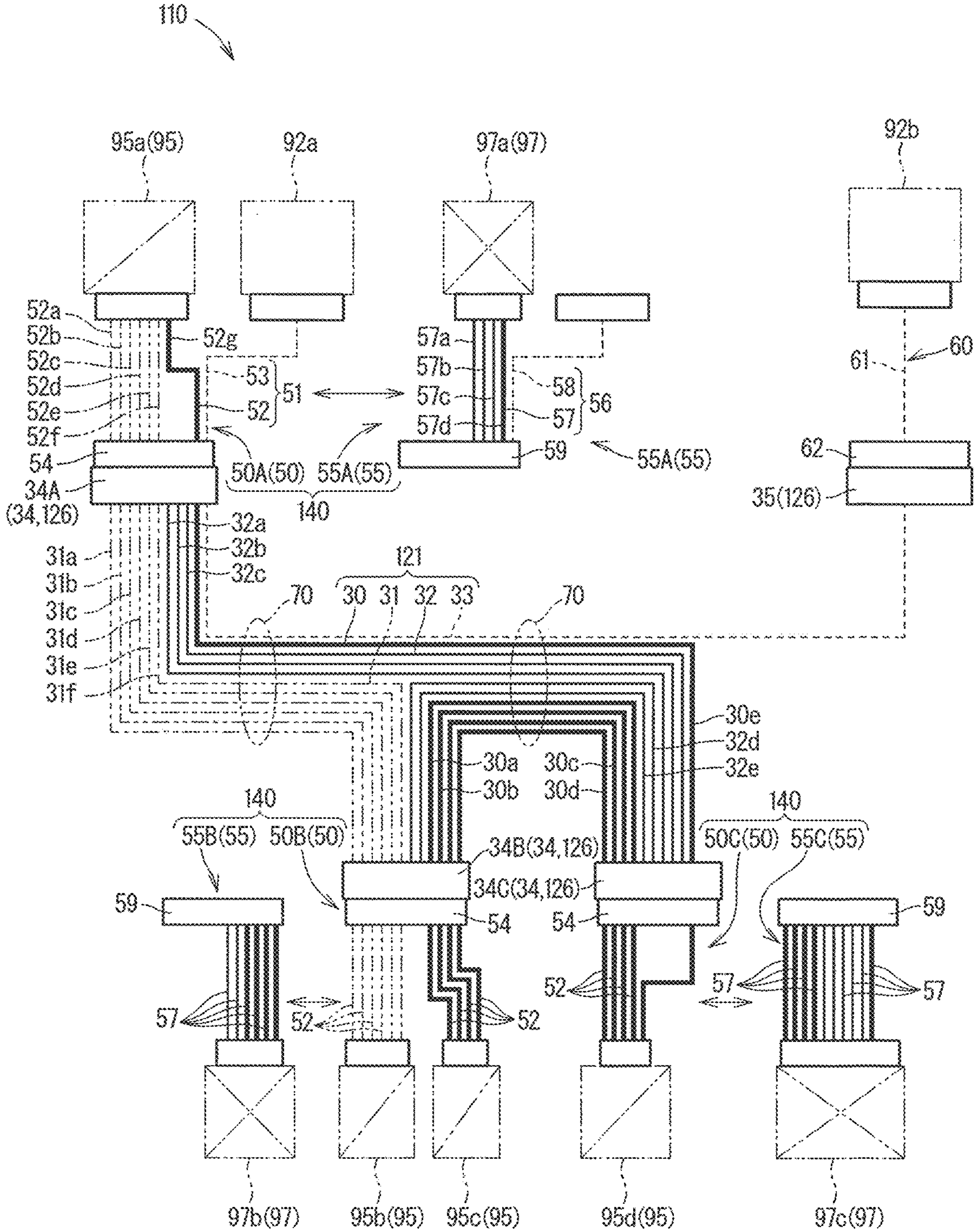
FIG. 5 is an explanation view illustrating a wiring system according to an embodiment 2.
Figure 6:
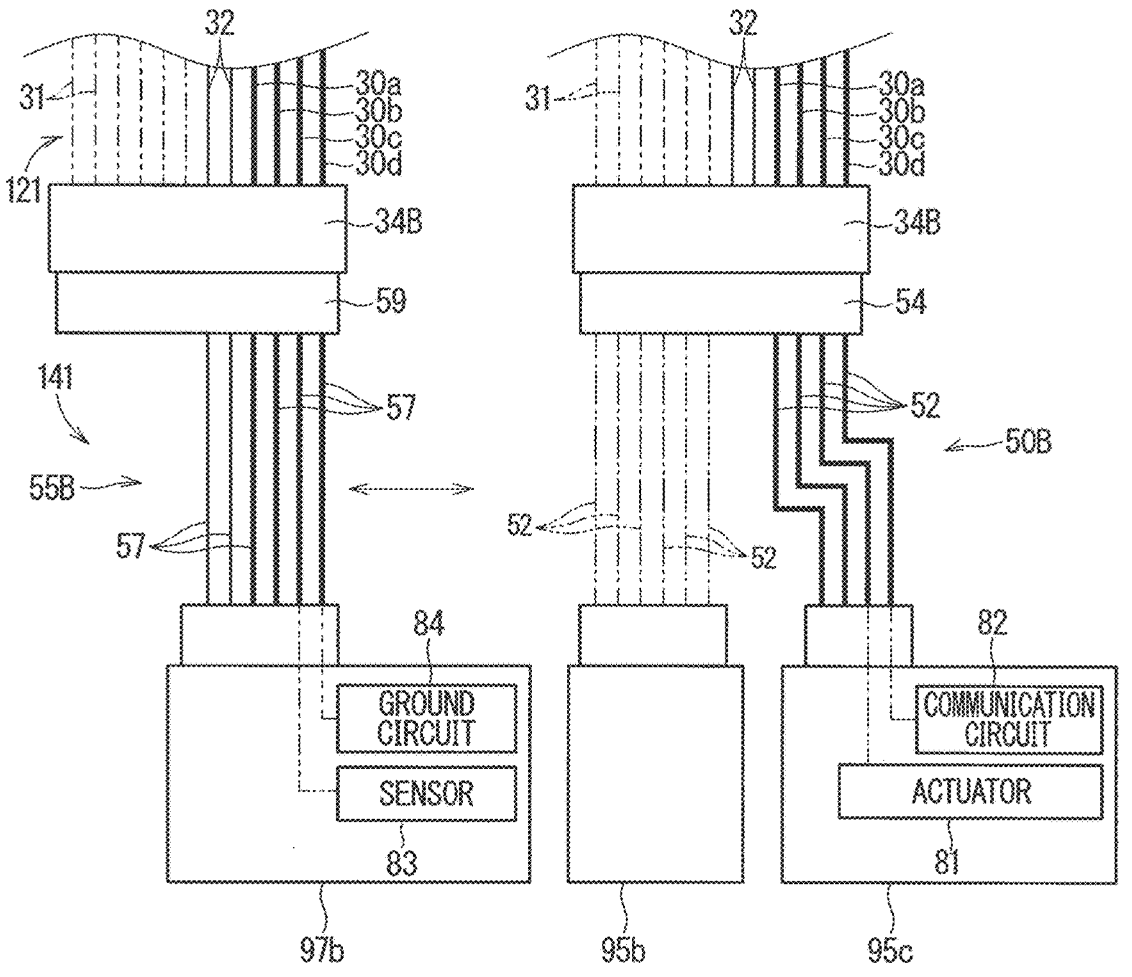
FIG. 6 is an explanation view illustrating an example of a connection between a main wire-side circuit and an apparatus-side circuit.

[Embodiment 2] A wiring system according to an embodiment 2 is described. FIG. 5 is an explanation view illustrating a wiring system 110 according to the embodiment 2. FIG. 6 is an explanation view illustrating an example of a connection between a main wire-side circuit 121 and an apparatus-side circuit 141. Each circuit is distinguished by a solid line, a thick line, a dotted line, and a dash-double-dot line, for example, in FIG. 5 and FIG. 6 for convenience of description. In the following description of the present embodiment, the same reference numerals are assigned to the similar constituent elements described above, and the description thereof will be omitted.

The wiring system 110 includes a main wire-side wiring member 120, and further exclusively includes a first specification wiring member 50 and a second specification wiring member 55 to which different types of the electrical apparatus are connected, respectively, as the apparatus-side wiring member 140. The configuration of the main wire-side wiring member 20 described above can be applied to the main wire-side wiring member 120 as long as they are not particularly contradictory. The configuration of the apparatus-side wiring member 40 described above can be applied to the first specification wiring member 50 and the second specification wiring member 55 as long as they are not particularly contradictory. An exclusive state herein indicates that when any one of a plurality of conditions is established, the other condition is not established. That is to say, when the wiring system 110 includes the first specification wiring member 50, the wiring system 110 does not include the second specification wiring member 55, and when the wiring system 110 includes the second specification wiring member 55, the wiring system 110 does not include the first specification wiring member 50. A possible existence of a third specification wiring member and a fourth specification wiring member, for example, is not denied as the whole wiring system 110.

The main wire-side circuit 121 in the main wire-side wiring member 120 includes a multipurpose circuit 30, a main wire-side first purpose circuit 31, a main wire-side second purpose circuit 32, and a common circuit 33.

The multipurpose circuit 30 is a circuit used for any of the first specification wiring member 50 and the second specification wiring member 55. The multipurpose circuit indicates that the circuit has a plurality of usage purposes. The multipurpose circuit 30 is also considered a circuit connected to different types of electrical apparatus 95 or the electrical apparatus 97 in accordance with the selected specification.

The main wire-side first purpose circuit 31 is a circuit for the first purpose electrical apparatus 95. The main wire-side second purpose circuit 32 is a circuit for the second purpose electrical apparatus 97. The main wire-side first purpose circuit 31 and the main wire-side second purpose circuit 32 may be open circuits, that is to say, unused circuits by the specification of the apparatus-side wiring member 140.

The common circuit 33 is a circuit used as a transmission path of the same type of electricity even when any of the first specification wiring member 50 and the second specification wiring member 55 is selected.

A main wire-side connector 126 in the main wire-side wiring member 120 includes a multipurpose connector 34 and a common connector 35.

The multipurpose connector 34 is a connector to which the multipurpose circuit 30 is connected. A first specification connector 54 or a second specification connector 59 are exclusively connected to the multipurpose connector 34.

The common connector 35 is a connector used as a connection interface to another wiring member or electrical apparatus even when any of the first specification wiring member 50 and the second specification wiring member 55 is selected. For example, the common circuit 33 is assumed to be connected to the common connector 35.

The first specification wiring member 50 includes a first specification circuit 51 as the apparatus-side circuit 41 and a first specification connector 54 as the apparatus-side connector 46. The first specification circuit 51 includes the first purpose circuit 52 connected to the first purpose electrical apparatus 95. FIG. 5 illustrates three first specification wiring members 50.

The first purpose circuit 52 is connected to the first specification connector 54. The first specification connector 54 is connected to the multipurpose connector 34, thus the multipurpose circuit 30 is electrically connected to the first purpose circuit 52. The other end of the first purpose circuit 52 is electrically connected to the electrical apparatus 95.

The second specification wiring member 55 includes a second specification circuit 56 as the apparatus-side circuit 41 and a second specification connector 59 as the apparatus-side connector 46. The second specification circuit 56 includes the second purpose circuit 57 connected to the second purpose electrical apparatus 97 different from the first purpose. FIG. 5 illustrates three second specification wiring members 55 corresponding to three first specification wiring members 50 described above.

The second purpose circuit 57 is connected to the second specification connector 59. The second specification connector 59 is connected to the multipurpose connector 34, thus the multipurpose circuit 30 is electrically connected to the second purpose circuit 57. The second purpose circuit 57 is electrically connected to the electrical apparatus 97.

The number of the first specification wiring members 50 needs not be the same as that of the second specification wiring members 55. When the number of the first specification wiring members 50 is different from that of the second specification wiring members 55, also assumed is a case where there is no connection destination of the multipurpose connector 34 depending on the specification. The first specification wiring member 50 and the second specification wiring member 55 are exclusively assembled to the vehicle in accordance with the selected specification. In other words, the second specification wiring member 55 is connected to the electrical apparatus 97 exclusively mounted to the electrical apparatus 95 in the vehicle.

A state where the type of the electrical apparatus 95 is different from that of the electrical apparatus 97 indicates that they can be grasped as different types of apparatus as a result of a fact that specifications to be applied are different from each other, for example. It is also assumed that some of the plurality of electrical apparatuses 95 constituting the first equipment specification and some of the plurality of electrical apparatuses 97 constituting the second equipment specification are the same components.

The first specification connector 54 and the second specification connector 59 are connected to the same multipurpose connector 34. Thus, the second specification connector 59 is assumed to be the same connector as the first specification connector 54. However, the number of the first purpose circuits 52 is different from that of the second purpose circuits 57, thus it is assumed that the number of the connector terminals of the first specification connector 54 and the second specification connector 59 is different from each other or at least one of the first specification connector 54 and/or the second specification connector 59 includes a dummy connector terminal which is not connected to the electrical wire.

When the plurality of electrical apparatuses are connection destinations of the multipurpose connector 34, the plurality of first purpose circuits 52 or the plurality of second purpose circuits 57 may be branched in a midway portion in the first specification wiring member 50 or the second specification wiring member 55. In FIG. 5, the plurality of first purpose circuits 52 are branched in a midway portion in accordance with the electrical apparatuses 95*b* and 95*c*.

Each of the first specification wiring member 50 and the second specification wiring member 55 may include apparatus-side common circuits 53 and 58 for common electrical apparatuses 92*a* and 92*b*. FIG. 5 illustrates an example that the first specification wiring member 50 includes the apparatus-side common circuit 53 and the second specification wiring member 55 includes the apparatus-side common circuit 58 in accordance with the electrical apparatus 92*a*. The apparatus-side common circuit 53 is connected to the first specification connector 54, and the apparatus-side common circuit 58 is connected to the second specification connector 59. When the first specification wiring member 50 is selected, the common circuit 33 in the main wire-side wiring member 120 is connected to the electrical apparatus 92*a* via the apparatus-side common circuit 53. When the second specification wiring member 55 is selected, the common circuit 33 in the main wire-side wiring member 120 is connected to the electrical apparatus 92*a* via the apparatus-side common circuit 58. That is to say, the apparatus-side common circuits 53 and 58 are circuits connected to the same type of electrical apparatus regardless of the specification.

Herein, the apparatus-side wiring member 140 further includes an apparatus-side common wiring member 60. In FIG. 5, the apparatus-side common wiring member 60 is connected to the common connector 35. The apparatus-side common wiring member 60 includes a circuit 61 and a connector 62. One end of the circuit 61 is connected to the connector 62, and the other end of the circuit 61 is connected to the common electrical apparatus 92*b* via the connector or without intervention of the connector. The connector 62 is connected to the common connector 35, thus the common circuit 33 in the main wire-side wiring member 120 is connected to the electrical apparatus 92*b* via the circuit 61. That is to say, the apparatus-side common wiring member 60 is a wiring member which does not include the first purpose circuit 52 and the second purpose circuit 57 depending on the specification but is connected to the same type of electrical apparatus regardless of the specification.

At least one of the main wire-side circuits 121 is the aluminum wire 22. At least one of the first specification circuits 51 is the copper wire 42 connected to the aluminum wire 22 of the main wire-side circuit 121. At least one of the second specification circuits 56 is the copper wire 42 connected to the aluminum wire 22 of the main wire-side circuit 121. Accordingly, when the first specification wiring member 50 is connected to the main wire-side wiring member 120, the aluminum wire 22 of the main wire-side circuit 121 and the copper wire 42 of the first specification circuit 51 are connected to each other. When the second specification wiring member 55 is connected to the main wire-side wiring member 120, the aluminum wire 22 of the main wire-side circuit 121 and the copper wire 42 of the second specification circuit 56 are connected to each other.

In the present embodiment, at least the multipurpose circuit 30 in the multipurpose circuit 30, the main wire-side first purpose circuit 31, the main wire-side second purpose circuit 32, and the common circuit 33 includes a circuit made up of the aluminum wire 22. When the multipurpose circuit 30 includes the plurality of circuits, the multipurpose circuit 30 may include both the circuit made up of the aluminum wire 22 and the circuit made up of the copper wire 23. However, it is also applicable that the multipurpose circuit 30 does not include the circuit made up of the aluminum wire 22, the main wire-side first purpose circuit 31 and the main wire-side second purpose circuit 32 include the circuit made up of the aluminum wire 22, or the common circuit 33 includes the circuit made up of the aluminum wire 22.

In the present embodiment, at least the first purpose circuit 52 in the first purpose circuit 52 and the apparatus-side common circuit 53 includes the circuit made up of the copper wire connected to the aluminum wire 22 in the first specification circuit 51. Particularly, the circuit made up of the copper wire is set to the circuit connected to the multipurpose circuit 30 in the first purpose circuit 52. When the main wire-side first purpose circuit 31 includes the circuit made up of the aluminum wire 22, the circuit made up of the copper wire is set to the circuit connected to the main wire-side first purpose circuit 31 in the first purpose circuit 52. When the common circuit 33 includes the circuit made up of the aluminum wire 22, the circuit made up of the copper wire is set to the apparatus-side common circuit 53.

In the similar manner, at least the second purpose circuit 57 in the second purpose circuit 57 and the apparatus-side common circuit 58 includes the circuit made up of the copper wire connected to the aluminum wire 22 in the second specification circuit 56. Particularly, the circuit made up of the copper wire is set to the circuit connected to the multipurpose circuit 30 in the second purpose circuit 57. When the main wire-side second purpose circuit 32 includes the circuit made up of the aluminum wire 22, the circuit made up of the copper wire is set to the circuit connected to the main wire-side second purpose circuit 32 in the second purpose circuit 57. When the common circuit 33 includes the circuit made up of the aluminum wire 22, the circuit made up of the copper wire is set to the apparatus-side common circuit 58.

The main wire-side wiring member 120 may include a circuit which is not the multipurpose circuit 30. The circuit which is not the multipurpose circuit 30 may include the circuit made up of the aluminum wire 22 or the circuit made up of the copper wire 23. When the circuit which is not the multipurpose circuit 30 includes the plurality of circuits, the circuit which is not the multipurpose circuit 30 may include both the circuit made up of the aluminum wire 22 and the circuit made up of the copper wire 23.

In the present embodiment, at least one of the multipurpose circuits 30 is the aluminum wire 22. At least one of the first purpose circuits 52 is the copper wire 42 connected to the aluminum wire 22 of the multipurpose circuit 30. At least one of the second purpose circuits 57 is the copper wire 42 connected to the aluminum wire 22 of the multipurpose circuit 30. Accordingly, when the first specification wiring member 50 is connected to the main wire-side wiring member 120, the aluminum wire 22 of the multipurpose circuit 30 and the copper wire 42 of the first purpose circuit 52 are connected to each other. When the second specification wiring member 55 is connected to the main wire-side wiring member 120, the aluminum wire 22 of the multipurpose circuit 30 and the copper wire 42 of the second purpose circuit 57 are connected to each other.

When the main wire-side circuit 121 includes the plurality of aluminum wires 22, the copper wire 42 of the first specification circuit 51 and the copper wire 42 of the second specification circuit 56 may be connected to the same aluminum wire 22 of the main wire-side circuit 121 or may also be connected to the aluminum wire 22 different from each other of the main wire-side circuit 121. In other words, it is also applicable that one aluminum wire 22 in the main wire-side circuit 121 is connected to the copper wire 42 of the first specification circuit 51 when a connection target of the main wire-side wiring member 120 is the first specification wiring member 50, and is connected to the copper wire 42 of the second specification circuit 56 when a connection target of the main wire-side wiring member 120 is the second specification wiring member 55. It is also applicable that one aluminum wire 22 in the main wire-side circuit 121 is connected to the aluminum wire 43 of the first specification circuit 51 when a connection target of the main wire-side wiring member 120 is the first specification wiring member 50, and is connected to the copper wire 42 of the second specification circuit 56 when a connection target of the main wire-side wiring member 120 is the second specification wiring member 55. It is also applicable that one aluminum wire 22 in the main wire-side circuit 121 is connected to the copper wire 42 of the first specification circuit 51 when a connection target of the main wire-side wiring member 120 is the first specification wiring member 50, and is connected to the aluminum wire 43 of the second specification circuit 56 when a connection target of the main wire-side wiring member 120 is the second specification wiring member 55. In the similar manner, also in a case where the multipurpose circuit 30 includes the plurality of aluminum wires 22, it is also applicable that the copper wire 42 of the first purpose circuit 52 and the copper wire 42 of the second purpose circuit 57 are connected to the same aluminum wire 22 of the multipurpose circuit 30, or are connected to the aluminum wires 22 different from each other of the multipurpose circuit 30.

More specifically described are a case where the first specification wiring member 50 is connected to the main wire-side wiring member 120 and a case where the second specification wiring member 55 is connected thereto in the wiring system 110.

The main wire-side wiring member 120 includes five multipurpose circuits 30. Five multipurpose circuits 30 are distinguished into the multipurpose circuits 30*a*, 30*b*, 30*c*, 30*d*, and 30*e* hereinafter as necessary.

The main wire-side wiring member 120 includes six main wire-side first purpose circuits 31 and five main wire-side second purpose circuits 32. Six main wire-side first purpose circuits 31 are distinguished into main wire-side first purpose circuits 31*a*, 31*b*, 31*c*, 31*d*, 31*e*, and 31*f* hereinafter as necessary. Five main wire-side second purpose circuits 32 are distinguished into main wire-side second purpose circuits 32*a*, 32*b*, 32*c*, 32*d*, and 32*e* hereinafter as necessary.

The multipurpose connector 34 in the main wire-side wiring member 120 is distinguished into the multipurpose connectors 34A, 34B, and 34C in accordance with a connection destination. Each end portion of the multipurpose circuit 30, the main wire-side first purpose circuit 31, and the main wire-side second purpose circuit 32 is connected to any connector terminal in the multipurpose connectors 34A, 34B, and 34C and the common connector 35.

Herein, one ends of the multipurpose circuits 30*a*, 30*b*, 30*c*, and 30*d* are connected to the connector terminal in the multipurpose connector 34B, and the other ends thereof are connected to the connector terminal in the multipurpose connector 34C. One end of the multipurpose circuit 30*e* is connected to the connector terminal in the multipurpose connector 34A, and the other end thereof is connected to the connector terminal in the multipurpose connector 34C.

One ends of the main wire-side first purpose circuits 31*a*, 31*b*, 31*c*, 31*d*, 31*e*, and 31*f* are connected to the connector terminal in the multipurpose connector 34A, and the other ends thereof are connected to the connector terminal in the multipurpose connector 34B.

One ends of the main wire-side second purpose circuits 32*a*, 32*b*, and 32*c* are connected to the connector terminal in the multipurpose connector 34A, and the other ends thereof are connected to the connector terminal in the multipurpose connector 34C. One ends of the main wire-side second purpose circuits 32*d* and 32*e* are connected to the connector terminal in the multipurpose connector 34B, and the other ends thereof are connected to the connector terminal in the multipurpose connector 34C.

One end of the common circuit 33 is connected to the connector terminal in the multipurpose connector 34A, and the other end thereof is connected to the connector terminal in the common connector 35. When the plurality of circuits described above pass through the same route, the plurality of circuits may be kept in a bundled state by a banding member 70 such as an adhesive tape or a banding band, for example.

The plurality of first specification wiring members 50 are distinguished into the first specification wiring members 50A, 50B, and 50C. The first specification wiring member 50A is connected to the multipurpose connector 34A, the first specification wiring member 50B is connected to the multipurpose connector 34B, and the first specification wiring member 50C is connected to the multipurpose connector 34C. The first specification wiring member 50A is connected to the electrical apparatus 95*a*, the first specification wiring member 50B is connected to the electrical apparatuses 95*b* and 95*c*, and the first specification wiring member 50C is connected to the electrical apparatus 95*d*.

The first specification wiring member 50A includes seven first purpose circuits 52 and one apparatus-side common circuit 53. The plurality of first purpose circuits 52 are distinguished into the first purpose circuits 52*a*, 52*b*, 52*c*, 52*d*, 52*e*, 52*f*, and 52*g*.

When the first specification connector 54 is connected to the multipurpose connector 34A, the first purpose circuits 52*a*, 52*b*, 52*c*, 52*d*, 52*e*, and 52*f* are electrically connected to the main wire-side first purpose circuits 31*a*, 31*b*, 31*c*, 31*d*, 31*e*, and 31*f*, and the first purpose circuit 52*g* is connected to the multipurpose circuit 30*e*. Thus, the main wire-side first purpose circuits 31*a*, 31*b*, 31*c*, 31*d*, 31*e*, and 31*f* and the multipurpose circuit 30*e* are electrically connected to the electrical apparatus 95*a* via the first purpose circuits 52*a*, 52*b*, 52*c*, 52*d*, 52*e*, 52*f*, and 52*g*.

The common circuit 33 is electrically connected to the electrical apparatus 92*a* via the apparatus-side common circuit 53. The main wire-side second purpose circuits 32*a*, 32*b*, and 32*c* are open circuits on a side of the multipurpose connector 34A.

The first specification wiring member 50B includes ten first purpose circuits 52. The plurality of first purpose circuits 52 are branched in a midway portion away from the first specification connector 54 to be connected to the electrical apparatuses 95*b* and 95*c*. When the first specification connector 54 is connected to the multipurpose connector 34B, the first purpose circuit 52 is connected to the main wire-side first purpose circuits 31*a*, 31*b*, 31*c*, 31*d*, 31*e*, and 31*f* and the multipurpose circuits 30*a*, 30*b*, 30*c*, and 30*d*. Thus, the main wire-side first purpose circuits 31*a*, 31*b*, 31*c*, 31*d*, 31*e*, and 31*f* and the multipurpose circuits 30*a*, 30*b*, 30*c*, and 30*d* are electrically connected to the electrical apparatus 95*b* or 95*c* via the first purpose circuit 52 of the first specification wiring member 50B. In this case, the main wire-side second purpose circuits 32*d* and 32*e* are in an open state in the multipurpose connector 34B.

The first specification wiring member 50C includes five first purpose circuits 52. When the first specification connector 54 is connected to the multipurpose connector 34C, the first purpose circuit 52 is connected to the multipurpose circuits 30*a*, 30*b*, 30*c*, 30*d*, and 30*e*. Thus, the multipurpose circuits 30*a*, 30*b*, 30*c*, 30*d*, and 30*e* are electrically connected to the electrical apparatus 95*d* via the first purpose circuit 52 of the first specification wiring member 50C. In this case, the main wire-side second purpose circuits 32*a*, 32*b*, 32*c*, 32*d*, and 32*e* are in an open state in the multipurpose connector 34C.

In the manner similar to the above description, the plurality of second specification wiring members 55 are distinguished into the second specification wiring members 55A, 55B, and 55C.

The second specification wiring member 55A includes three second purpose circuits 57 and one apparatus-side common circuit 58. The plurality of second purpose circuits 57 are distinguished into the second purpose circuits 57*a*, 57*b*, 57*c*, and 57*d*.

When the second specification connector 59 is connected to the multipurpose connector 34A, the second purpose circuits 57*a*, 57*b*, and 57*c* are electrically connected to the main wire-side second purpose circuits 32*a*, 32*b*, and 32*c*, and the second purpose circuit 57*d* is connected to the multipurpose circuit 30*e*. Thus, the main wire-side second purpose circuits 32*a*, 32*b*, and 32*c* and the multipurpose circuit 30*e* are electrically connected to the electrical apparatus 97*a* via the second purpose circuits 57*a*, 57*b*, 57*c*, and 57*d*.

In the manner similar to the case of selecting the first specification wiring member 50A, the common circuit 33 is electrically connected to the electrical apparatus 92*a* via the apparatus-side common circuit 58. Differing from the case of selecting the first specification wiring member 50A, the main wire-side first purpose circuits 31*a*, 31*b*, 31*c*, 31*d*, 31*e*, and 31*f* are in an open state in a side of the multipurpose connector 34A.

The second specification wiring member 55B includes six second purpose circuits 57. When the second specification connector 59 is connected to the multipurpose connector 34B, the second purpose circuit 57 is connected to the main wire-side second purpose circuits 32*d* and 32*e* and the multipurpose circuits 30*a*, 30*b*, 30*c*, and 30*d*. Thus, the main wire-side second purpose circuits 32*d* and 32*e* and the multipurpose circuits 30*a*, 30*b*, 30*c*, and 30*d* are electrically connected to the electrical apparatus 97*b* via the second purpose circuits 57 of the second specification wiring member 55B. In this case, the main wire-side first purpose circuits 31*a*, 31*b*, 31*c*, 31*d*, 31*e*, and 31*f* are in an open state in the multipurpose connector 34B.

The second specification wiring member 55C includes ten second purpose circuits 57. When the second specification connector 59 is connected to the multipurpose connector 34C, the second purpose circuit 57 is connected to the multipurpose circuits 30*a*, 30*b*, 30*c*, 30*d*, and 30*e* and the main wire-side second purpose circuits 32*a*, 32*b*, 32*c*, 32*d*, and 32*e*. Thus, the multipurpose circuits 30*a*, 30*b*, 30*c*, 30*d*, and 30*e* and the main wire-side second purpose circuits 32*a*, 32*b*, 32*c*, 32*d*, and 32*e* are electrically connected to the electrical apparatus 97*c* via the second purpose circuit 57 of the second specification wiring member 55C.

<Example of Connection Destination of Multipurpose Circuit 30>

FIG. 6 is an explanation view illustrating an example of a connection destination of the multipurpose circuit 30. FIG. 6 illustrates an example of the multipurpose circuits 30*a*, 30*b*, 30*c*, and 30*d* connected to the electrical apparatus 95*c* via the first specification wiring member 50 and an example thereof connected to the electrical apparatus 97*b* via the second specification wiring member 55.

As illustrated in FIG. 6, the multipurpose circuit 30 includes the multipurpose circuits 30*c* and 30*d* transmitting different types of electricity between a state where the first specification connector 54 is connected to the multipurpose connector 34B and a state where the second specification connector 59 is connected to the multipurpose connector 34B.

The circuit transmitting the different types of electricity is a circuit in which voltage to be applied, a maximum current value to be assumed, or a signal form is different between the first equipment specification and the second equipment specification, for example.

The multipurpose connector 34 may include the multipurpose circuits 30*c* and 30*d* transmitting different types of electricity for any of a power source, a ground, and a signal between a state where the first specification connector 54 is connected to the multipurpose connector 34B and a state where the second specification connector 59 is connected to the multipurpose connector 34B.

In the example illustrated in FIG. 6, when the first specification connector 54 of the first specification wiring member 50 is connected to the multipurpose connector 34B, the multipurpose circuit 30*c* is connected to an actuator 81 to serve as a circuit for supplying power source electricity of the actuator 81. In the meanwhile, when the second specification connector 59 of the second specification wiring member 55 is connected to the multipurpose connector 34B, the multipurpose circuit 30*c* is connected to a sensor 83 to serve as a circuit for transmitting a detection signal.

When the first specification connector 54 of the first specification wiring member 50 is connected to the multipurpose connector 34B, the multipurpose circuit 30*d* is connected to a communication circuit 82 to serve as a circuit for transmitting a communication signal. In the meanwhile, when the second specification connector 59 of the second specification wiring member 55 is connected to the multipurpose connector 34B, the multipurpose circuit 30*d* is connected to a ground circuit 84 to serve as a circuit transmitting electricity for a ground.

A size of a cross section of the multipurpose circuit 30 is not particularly limited. For example, when the multipurpose circuit 30 is a core wire of an electrical wire, a cross-sectional area of the core wire may be classified into any of 0.13 sq, 0.35 sq, 0.5 sq, and 2 sq.

<Example of Application to Vehicle>

Figure 7:
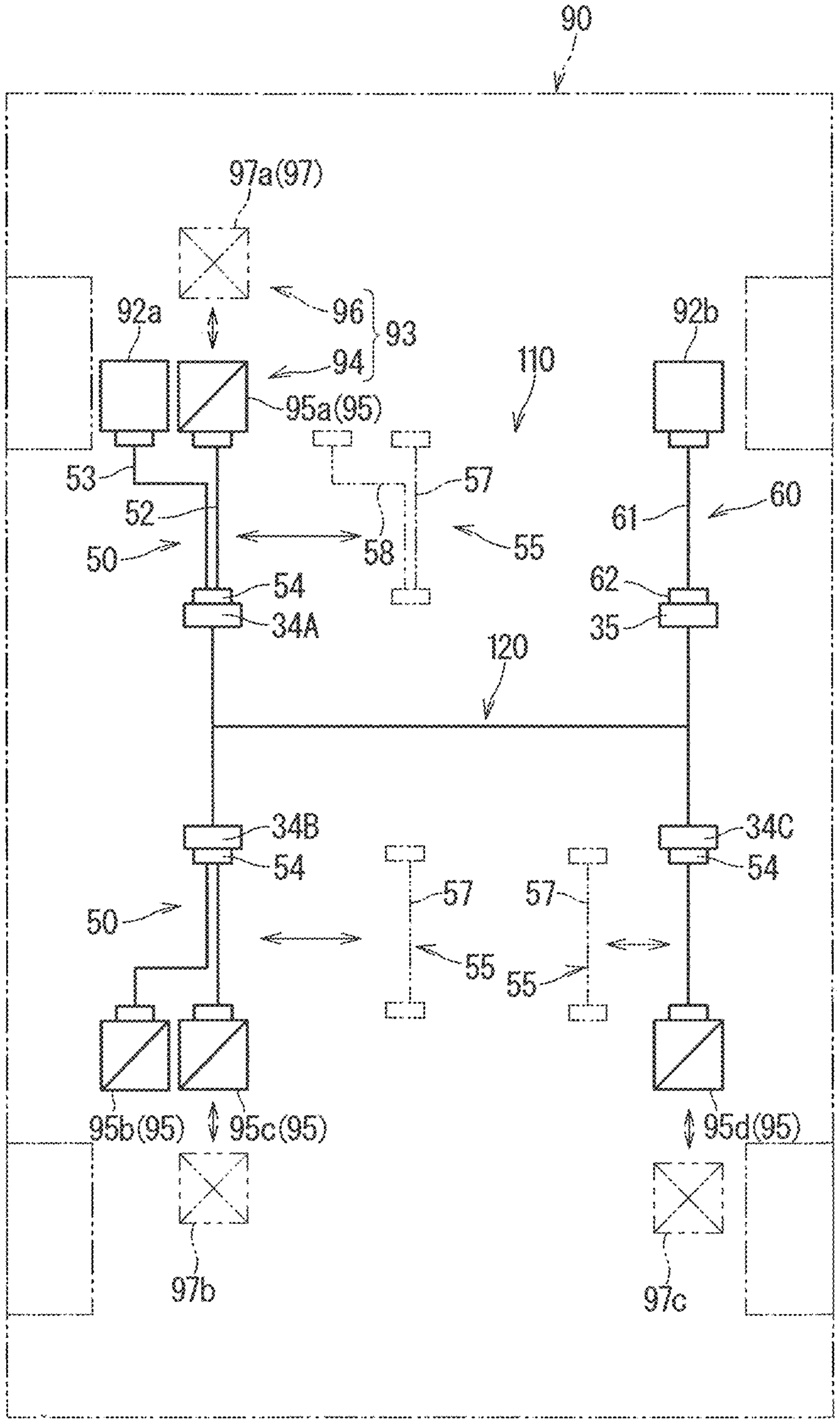
FIG. 7 is an explanation view illustrating an example of applying the wiring system according to the embodiment 2 to a vehicle.

FIG. 7 is an explanation view illustrating an example of the wiring system 110 according to the embodiment 2 applied to a vehicle 90.

An example of a system mounted to the vehicle 90 is described. A common equipment system 91 is mounted to the vehicle 90. The common equipment system 91 is a system mounted to specific platform or a specific type of vehicle in common regardless of a difference of a grade and a difference of an optional component. For example, when a common installment panel system is mounted to a specific platform or a specific type of vehicle, the installment panel system is an example of the common equipment system 91. The common equipment system 91 includes at least one of electrical apparatuses 92*a* and 92*b* for achieving a function of the common equipment system 91. For example, when the common equipment system 91 is an installment panel system, the common equipment system 91 includes a display device displaying various types of information for a driver, a switch receiving various instructions from the driver, and an electronic control unit (ECU) as the electrical apparatuses 92*a* and 92*b*. The ECU performs display control of the display device, reception of instruction via the switch, and reception of various signals from various types of sensors and the other ECU, for example. FIG. 7 exemplifies two electrical apparatuses 92*a* and 92*b*, however, the number and position thereof are not particularly limited.

An exclusive equipment system 93 is set to the vehicle 90. The exclusive equipment system 93 is a system capable of exclusively adopting a first equipment specification 94 and a second equipment specification 96 to the vehicle 90. Herein, an exclusive state indicates that when any one of a plurality of conditions is established, the other condition is not established as described above. Thus, a state where the first equipment specification 94 and the second equipment specification 96 can be exclusively adopted indicates that when the first equipment specification 94 is adopted, the second equipment specification 96 cannot be adopted, and when the second equipment specification 96 is adopted, the first equipment specification 94 cannot be adopted. In this case, the exclusive equipment system 93 does not exclude a state where a third equipment specification and a fourth equipment specification, for example, can be adopted as the other exclusive choices in addition to the first equipment specification 94 and the second equipment specification 96.

An example of the exclusive equipment system is a case where the first equipment specification 94 is an automatic transmission (AT) specification, and the second equipment specification 96 is a manual transmission (MT) specification. For example, when the first equipment specification 94 is the AT specification, the exclusive equipment system includes a sensor detecting a position of a shift lever, a switch receiving instruction on an operation mode of AT, an AT mechanism including various solenoids and various sensors to change the number of rotations of a drive source, and an ECU for AT, as the electrical apparatus 95. The ECU for AT controls a transmission gear ratio in the AT mechanism in accordance with a vehicle speed, the number of rotations of an engine, and an operation of an accelerator, for example. For example, when the second equipment specification 96 is the MT specification, the exclusive equipment system includes a sensor detecting a position of a shift lever, a sensor detecting a position of a clutch pedal, and an ECU for an engine, as the electrical apparatus 97. The description according to the present embodiment is based on an assumption that the first equipment specification 94 is the AT specification, and the second equipment specification 96 is the MT specification. The AT specification and the MT specification are exclusively mounted to the vehicle 90 as specifications changing the rotation of the travel drive source and transmitting it to vehicle wheels.

When the wiring system 110 is applied to the first equipment specification 94, the first specification wiring members 50A, 50B, and 50C are selected. In this case, the multipurpose circuit 30 and the main wire-side first purpose circuit 31 in the main wire-side wiring member 120 are used, and the main wire-side second purpose circuit 32 is not used while being in the open state in each connector.

When the wiring system 110 is applied to the second equipment specification 96, the second specification wiring members 55A, 55B, and 55C are selected. In this case, the multipurpose circuit 30 and the main wire-side second purpose circuit 32 in the main wire-side wiring member 120 are used, and the main wire-side first purpose circuit 31 is not used while being in the open state in each connector.

In any case, the multipurpose circuit 30 is used. That is to say, the multipurpose circuit 30 is used as a circuit for the plurality of specifications. The multipurpose circuit 30 is used as the multipurpose circuit in common between the plurality of specifications, thus the number of circuits can be reduced as the wiring member for the plurality of specifications.

FIG. 7 exemplifies two electrical apparatuses 92*a* and 92*b*, four electrical apparatuses 95*a*, 95*b*, 95*c*, and 95*d*, and three electrical apparatuses 97*a*, 97*b*, and 97*c*, however, the number and position thereof are optionally set.

The other example of the exclusive equipment system is a case where the first equipment specification is a mechanical key specification and the second equipment specification is a smart key specification. The mechanical key specification is a system that a key owned by a driver is inserted into a keyhole provided to a door or an area around a handle in a vehicle to lock and unlock the door, switch a state to a handle unlocked-state, and switch a state to an operable state of a power source, for example. The smart key specification is a system performing wireless communication between a wireless communication device mounted to a vehicle and a wireless key terminal owned by a driver to lock and unlock a door of the vehicle, switch a state to a handle unlocked-state, and switch a state to an operable state of a power source, for example. There is a possibility that the smart key specification includes a configuration relating to the mechanical key specification. A configuration relating to the smart key specification is not incorporated into the mechanical key specification. The mechanical key specification and the smart key specification are exclusively mounted to the vehicle as a security specification locking and unlocking each unit in the vehicle.

The still other example of the exclusive equipment system is a case where the first equipment specification is a specification for an internal combustion engine and the second equipment specification is a specification for a hybrid of an internal combustion engine and an electrical motor regarding a travel power system of a vehicle. In this case, the first equipment specification or the second equipment specification may be a specification for an electrical motor. A specification for an electrical motor may be set as a third equipment specification in addition to the first equipment specification and the second equipment specification. Each specification described above is exclusively mounted to a vehicle as a system regarding a travel power of the vehicle.

The still other example of the exclusive equipment system is a case where the first equipment specification is a simple specification and the second equipment specification is a deluxe specification regarding a system of a sound and a video in a vehicle. For example, assumed is a case where the first equipment specification is a specification including only a radio receiver and a speaker and the second equipment specification is a specification including a multimedia player, a display device, a multichannel speaker, and a camera taking an image outside the vehicle.

In the example of the common equipment system and the exclusive equipment system described above, some of the electrical apparatuses constituting the common equipment system and some of the electrical apparatuses constituting the exclusive equipment system may be used in common in both the systems. Some of the electrical apparatuses constituting the first equipment specification and some of the electrical apparatuses constituting the second equipment specification set as the exclusive equipment system may be used in common.

The first equipment specification and the second equipment specification may be specifications exclusively selected in manufacturing the vehicle or specifications exclusively selected after manufacturing the vehicle. After one of the first equipment specification and the second equipment specification is selected in manufacturing the vehicle, the specification may be changed to the other one of the first equipment specification and the second equipment specification. For example, the system regarding the sound and the video in the vehicle can be the specification exclusively selected after manufacturing the vehicle, and can be the specification changed from one of the first equipment specification and the second equipment specification to the other one thereof after manufacturing the vehicle.

Effect Etc.

According to the present wiring system 110, the function effect similar to that in the embodiment 1 described above can be obtained. In addition, the main wire-side circuit 121 includes the multipurpose circuit 30, and when the first specification connector 54 is connected to the main wire-side connector 126, the multipurpose circuit 30 is connected to the first purpose circuit 52, and when the second specification connector 59 is connected to the main wire-side connector 126, the multipurpose circuit 30 is connected to the second purpose circuit 57. Accordingly, plural types of wiring members 50 and 55 having specifications different from each other can be used in accordance with types of the electrical apparatuses 95 and 97 as the apparatus-side wiring member 140 while the main wire-side wiring member 120 is used in common in the wiring system 110, and it is possible to easily deal with a difference of specification of a vehicle. The main wire-side wiring member 120 used in common includes the aluminum wire 22, thus the aluminum wire 22 can be incorporated into the wiring system 110 regardless of the specification of the apparatus-side wiring member 140.

Normally, as a current value of current flowing in a circuit gets larger, a conductor cross-sectional area of the circuit needs to be increased, thus a weight of the circuit increases by the increase of the conductor cross-sectional area thereof. There is a case where a large conductor cross-sectional area corresponding a purpose having the largest current value in a plurality of purposes different from each other is defined as a conductor cross-sectional area of the multipurpose circuit 30. Even in this case, the multipurpose circuit 30 includes the aluminum wire 22, thus increase of the weight of the multipurpose circuit 30 can be suppressed.

APPENDIX

In the above description, the ratio of the aluminum wires 22 and 43 is equal to or higher than that of the copper wires 23 and 42 in the thick electrical wire group 25, however, this configuration is not necessary. The ratio of the aluminum wires 22 and 43 may be lower than that of the copper wires 23 and 42 in the thick electrical wire group 25.

In the above description, the ratio of the aluminum wires 22 and 43 in the circuit connected to the apparatus-side circuit 41 in the main wire-side circuit 21 is equal to or higher than that of the aluminum wires 22 and 43 in the circuit connected to the main wire-side circuit 21 in the apparatus-side circuit 41, however, this configuration is not necessary. The ratio of the aluminum wires 22 and 43 in the circuit connected to the apparatus-side circuit 41 in the main wire-side circuit 21 may be lower than that of the aluminum wires 22 and 43 in the circuit connected to the main wire-side circuit 21 in the apparatus-side circuit 41.

The configurations described in the embodiments and modification examples thereof can be appropriately combined as long as they are not contradictory.

EXPLANATION OF REFERENCE SIGNS

10, 110 wiring member
20, 120 main wire-side wiring member
21, 121 main wire-side circuit
22, 22*a*, 22*b* aluminum wire
23 copper wire
24 thin electrical wire group
25 thick electrical wire group
26 main wire-side connector
26T main wire-side connector terminal
26H main wire-side connector housing
30, 30*a*, 30*b*, 30*c*, 30*d*, 30*e* multipurpose circuit
31, 31*a*, 31*b*, 31*c*, 31*d*, 31*e*, 31*f* main wire-side first purpose circuit
32, 32*a*, 32*b*, 32*c*, 32*d*, 32*e* main wire-side second purpose circuit
33 common circuit
34, 34A, 34B, 34C multipurpose connector
35 common connector
40, 140 apparatus-side wiring member
41 apparatus-side circuit
42*a*, 42*b* copper wire
43 aluminum wire
44 first electrical apparatus circuit
45 second electrical apparatus circuit
46 apparatus-side connector
46T apparatus-side connector terminal
46H apparatus-side connector housing
47 apparatus connector
47*a* first electrical apparatus connector
47*b* second electrical apparatus connector
50, 50A, 50B, 50C first specification wiring member
51 first specification circuit
52, 52*a*, 52*b*, 52*c*, 52*d*, 52*e*, 52*f*, 52*g* first purpose circuit
53 apparatus-side common circuit
54 first specification connector
55, 55A, 55B, 55C second specification wiring member
56 second specification circuit
57, 57*a*, 57*b*, 57*c*, 57*d* second purpose circuit
58 apparatus-side common circuit
59 second specification connector
60 apparatus-side common wiring member
61 circuit
62 connector
70 banding member
80 electrical apparatus
80*a* first electrical apparatus
80*b* second electrical apparatus
81 actuator
82 communication circuit
83 sensor
84 ground circuit
90 vehicle
91 common equipment system
92*a*, 92*b* electrical apparatus
93 exclusive equipment system
94 first equipment specification
95, 95*a*, 95*b*, 95*c*, 95*d* first purpose electrical apparatus
96 second equipment specification
97, 97*a*, 97*b*, 97*c* second purpose electrical apparatus

The invention claimed is:

1. A wiring system, comprising a main wire-side wiring member including at least one main wire-side circuit and a main wire-side connector to which the main wire-side circuit is connected; and an apparatus-side wiring member including an apparatus-side connector connected to the main wire-side connector and at least one apparatus-side circuit having one end connected to the apparatus-side connector and another end electrically connected to an electrical apparatus, wherein at least one of the main wire-side circuits is an aluminum wire, at least one of the apparatus-side circuits is a copper wire connected to the aluminum wire via the apparatus-side connector and the main wire-side connector, the main wire-side wiring member includes a plurality of electrical wires each constituting the main wire-side circuit, when an electrical wire group made up of only electrical wires having a cross-sectional area of 0.13 sq or less is a thin electrical wire group, and an electrical wire group made up of only electrical wires having a cross-sectional area larger than 0.13 sq is a thick electrical wire group based on a conductor cross-sectional area, the plurality of electrical wires include electrical wires constituting the thin electrical wire group and electrical wires constituting the thick electrical wire group, the thick electrical wire group includes the aluminum wire, and a ratio of the aluminum wire is equal to or higher than a ratio of a copper wire in the thick electrical wire group.

2. The wiring system according to claim 1, exclusively comprising a first specification wiring member and a second specification wiring member to which different types of the electrical apparatus are connected, respectively, as the apparatus-side wiring member, wherein the first specification wiring member includes a first specification connector as the apparatus-side connector and at least one first specification circuit as the apparatus-side circuit, the second specification wiring member includes a second specification connector as the apparatus-side connector and at least one second specification circuit as the apparatus-side circuit, the first specification circuit includes a first purpose circuit connected to the electrical apparatus having a first purpose, the second specification circuit includes a second purpose circuit connected to the electrical apparatus having a second purpose different from the first purpose, the main wire-side circuit includes at least one multipurpose circuit, when the first specification connector is connected to the main wire-side connector, the multipurpose circuit is connected to the first purpose circuit, and when the second specification connector is connected to the main wire-side connector, the multipurpose circuit is connected to the second purpose circuit.

3. The wiring system according to claim 2, wherein at least one of the multipurpose circuits is the aluminum wire, and each of at least one of the first specification circuits and at least one of the second specification circuits is the copper wire.

4. The wiring system according to claim 1, wherein the electrical apparatus includes a first electrical apparatus and a second electrical apparatus disposed in an area having a lower possibility of splash of water than an area where the first electrical apparatus is disposed, the apparatus-side wiring member includes a first electrical apparatus connector connector-connected to the first electrical apparatus and a second electrical apparatus connector connector-connected to the second electrical apparatus, the apparatus-side circuit includes at least one first electrical apparatus circuit connecting the first electrical apparatus connector and the apparatus-side connector and at least one second electrical apparatus circuit connecting the second electrical apparatus connector and the apparatus-side connector, each of at least one circuit connected to the first electrical apparatus circuit and at least one circuit connected to the second electrical apparatus circuit in the main wire-side circuits is the aluminum wire, at least one of the first electrical apparatus circuits is the copper wire, and at least one of the second electrical apparatus circuits is an aluminum wire connected to the aluminum wire via the apparatus-side connector and the main wire-side connector.

5. The wiring system according to claim 1, wherein a ratio of the aluminum wire in a circuit connected to the apparatus-side circuit in the main wire-side circuit is equal to or higher than a ratio of an aluminum wire in a circuit connected to the main wire-side circuit in the apparatus-side circuit.

6. The wiring system according to claim 1, wherein the main wire-side connector includes a connector terminal connected to the aluminum wire, and a connection part between the connector terminal and the aluminum wire is not corrosion proofed.

* * * * *